US012771958B2

(12) United States Patent
Dai et al.

(10) Patent No.: US 12,771,958 B2
(45) Date of Patent: Oct. 20, 2026

(54) METHODS FOR OPERATING HYBRID IMAGE SENSORS HAVING DIFFERENT CIS-TO-EVS RESOLUTIONS

(71) Applicant: OMNIVISION TECHNOLOGIES, INC., Santa Clara, CA (US)

(72) Inventors: Tiejun Dai, Santa Clara, CA (US); Bo Mu, San Jose, CA (US); Menghan Guo, Shanghai (CN); Wenlei Yang, Shanghai (CN); Qinyi Wang, West Coast Vale (SG); Andreas Suess, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 42 days.

(21) Appl. No.: 18/938,125

(22) Filed: Nov. 5, 2024

(65) Prior Publication Data

US 2025/0159367 A1 May 15, 2025

Related U.S. Application Data

(60) Provisional application No. 63/597,638, filed on Nov. 9, 2023.

(51) Int. Cl.
*H04N 5/335* (2011.01)
*H04N 23/68* (2023.01)
(Continued)

(52) U.S. Cl.
CPC ......... *H04N 25/47* (2023.01); *H04N 23/6811* (2023.01); *H04N 23/683* (2023.01);
(Continued)

(58) Field of Classification Search
CPC ...................................................... H04N 25/47
See application file for complete search history.

(56) References Cited

U.S. PATENT DOCUMENTS

| | | | | |
|---|---|---|---|---|
| 11,288,818 | B2 | 3/2022 | Daniilidis et al. | |
| 11,785,200 | B1 * | 10/2023 | Smits | H04N 13/282<br>348/48 |

(Continued)

OTHER PUBLICATIONS

Pan, et al., "Bringing a Blurry Frame Alive at High Frame-Rate with an Event Camera", retrieved from: https://openaccess.thecvf.com/content_CVPR_2019/papers/Pan_Bringing_a_Blurry_Frame_Alive_at_High_Frame-Rate_With_an_CVPR_2019_paper.pdf, 2019, 6820-6829.

(Continued)

*Primary Examiner* — Gary C Vieaux
(74) *Attorney, Agent, or Firm* — Dorsey & Whitney LLP

(57) ABSTRACT

Methods for operating hybrid image sensors having different CIS-to-EVS resolutions (and associated systems, devices, and methods) are disclosed herein. In one embodiment, an imaging system includes a hybrid image sensor including (a) an event driven sensing array including one or more event vision sensor (EVS) pixels arranged in one or more EVS pixel rows and configured to capture EVS data having an EVS resolution, and (b) a pixel array including a plurality of CMOS image sensor (CIS) pixels arranged in one or more CIS pixel rows and configured to capture CIS data having a CIS resolution. The imaging system can further include control circuitry configured to adjust the CIS resolution of the CIS data and/or the EVS resolution of the EVS data such that a mismatch between the CIS resolution and the EVS resolution is reduced.

20 Claims, 8 Drawing Sheets

(51) Int. Cl.

| | |
|---|---|
| ***H04N 23/81*** | (2023.01) |
| ***H04N 23/84*** | (2023.01) |
| ***H04N 25/42*** | (2023.01) |
| ***H04N 25/46*** | (2023.01) |
| ***H04N 25/47*** | (2023.01) |
| ***H04N 25/53*** | (2023.01) |
| ***H04N 25/616*** | (2023.01) |
| ***H04N 25/62*** | (2023.01) |
| ***H04N 25/707*** | (2023.01) |
| ***H04N 25/76*** | (2023.01) |
| ***H04N 25/766*** | (2023.01) |
| ***H04N 25/767*** | (2023.01) |
| ***H04N 25/78*** | (2023.01) |
| ***H04N 25/79*** | (2023.01) |
| *H04N 23/45* | (2023.01) |
| *H04N 25/531* | (2023.01) |

(52) U.S. Cl.

CPC ........... *H04N 23/81* (2023.01); *H04N 23/843* (2023.01); *H04N 25/42* (2023.01); *H04N 25/46* (2023.01); *H04N 25/53* (2023.01); *H04N 25/616* (2023.01); *H04N 25/62* (2023.01); *H04N 25/707* (2023.01); *H04N 25/76* (2023.01); *H04N 25/766* (2023.01); *H04N 25/767* (2023.01); *H04N 25/78* (2023.01); *H04N 25/79* (2023.01); *H04N 23/45* (2023.01); *H04N 25/531* (2023.01)

(56) References Cited

U.S. PATENT DOCUMENTS

| | | | |
|---|---|---|---|
| 2013/0058587 A1 | 3/2013 | Wang et al. | |
| 2015/0146037 A1 | 5/2015 | Keelan | |
| 2017/0187961 A1 | 6/2017 | Katz et al. | |
| 2018/0189937 A1 | 7/2018 | Bala et al. | |
| 2020/0389582 A1 | 12/2020 | Herman | |
| 2021/0174092 A1* | 6/2021 | Zhao ......................... | G06T 3/40 |
| 2021/0344867 A1 | 11/2021 | Gao et al. | |
| 2022/0284593 A1 | 9/2022 | Naganuma et al. | |
| 2022/0329771 A1 | 10/2022 | Perrone et al. | |
| 2023/0030562 A1 | 2/2023 | Seo et al. | |
| 2023/0042364 A1 | 2/2023 | Ye et al. | |
| 2023/0230212 A1* | 7/2023 | García Capel ............ | G06T 5/92 382/100 |
| 2023/0254579 A1* | 8/2023 | Perrone ..................... | G06T 5/73 348/208.6 |
| 2024/0169492 A1 | 5/2024 | Ollila et al. | |
| 2024/0236517 A1 | 7/2024 | Kim et al. | |
| 2025/0159370 A1 | 5/2025 | Dai et al. | |
| 2025/0159371 A1 | 5/2025 | Dai et al. | |
| 2025/0159375 A1 | 5/2025 | Dai et al. | |
| 2025/0159376 A1 | 5/2025 | Dai et al. | |
| 2025/0240538 A1* | 7/2025 | Liu ...................... | G06V 10/803 |
| 2025/0373939 A1 | 12/2025 | Miyatani et al. | |
| 2025/0386115 A1 | 12/2025 | Kim et al. | |

OTHER PUBLICATIONS

United States Non-Final Office Action received in U.S. Appl. No. 18/938,080 dated Apr. 15, 2026, pp all.

U.S. Non-Final Office Action received in U.S. Appl. No. 18/938,208 dated May 8, 2026, pp all.

Notice of Allowance received in U.S. Appl. No. 18/938,080 dated Feb. 18, 2026, pp all.

Notice of Allowance received in U.S. Appl. No. 18/937,933 dated Mar. 17, 2026, pp all.

Non-Final Office Action received in U.S. Appl. No. 18/938,184 dated Feb. 24, 2026, pp all.

* cited by examiner

330

| | |
|---|---|
| *EVS* pixel row N | CIS pixel row 4N |
| | CIS pixel row 4N+1 |
| | CIS pixel row 4N+2 |
| | CIS pixel row 4N+3 |
| *EVS* pixel row N+1 | CIS pixel row 4N+4 |
| | CIS pixel row 4N+5 |
| | CIS pixel row 4N+6 |
| | CIS pixel row 4N+7 |
| *EVS* pixel row N+2 | CIS pixel row 4N+8 |
| | CIS pixel row 4N+9 |
| | CIS pixel row 4N+10 |
| | CIS pixel row 4N+11 |

METHODS FOR OPERATING HYBRID IMAGE SENSORS HAVING DIFFERENT CIS-TO-EVS RESOLUTIONS

CROSS-REFERENCE TO RELATED APPLICATION(S)

The present application claims the benefit of U.S. Provisional Patent Application No. 63/597,638, filed Nov. 9, 2023, which is incorporated by reference herein in its entirety.

This application contains subject matter related to cofiled, copending, and coassigned U.S. patent application Ser. No. 18/938,208, filed Nov. 5, 2024, and titled "HYBRID IMAGE SENSORS WITH ON-CHIP IMAGE DEBLUR," which is incorporated herein by reference in its entirety.

This application contains subject matter related to cofiled, copending, and coassigned U.S. patent application Ser. No. 18/938,184, filed Nov. 5, 2024, and titled "HYBRID IMAGE SENSORS WITH ON-CHIP IMAGE DEBLUR AND ROLLING SHUTTER DISTORTION CORRECTION," which is incorporated herein by reference in its entirety.

This application contains subject matter related to cofiled, copending, and coassigned U.S. patent application Ser. No. 18/938,080, filed Nov. 5, 2024, and titled "HYBRID IMAGE SENSORS WITH VIDEO FRAME INTERPOLATION," which is incorporated herein by reference in its entirety.

This application contains subject matter related to cofiled, copending, and coassigned U.S. patent application Ser. No. 18/937,933, filed Nov. 5, 2024, and titled "HYBRID IMAGE SENSORS WITH ADJUSTABLE CONTRAST THRESHOLDS," which is incorporated herein by reference in its entirety.

TECHNICAL FIELD

This disclosure relates generally to image sensors. For example, several embodiments of the present technology relate to hybrid image sensors with active pixels (e.g., CMOS image sensor (CIS) pixels) and event vision sensor (EVS) pixels, and to associated methods of operating such hybrid image sensors to address different CIS-to-EVS resolutions.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference numbers are used to refer to like or similar components throughout unless otherwise specified.

Figure 1A:
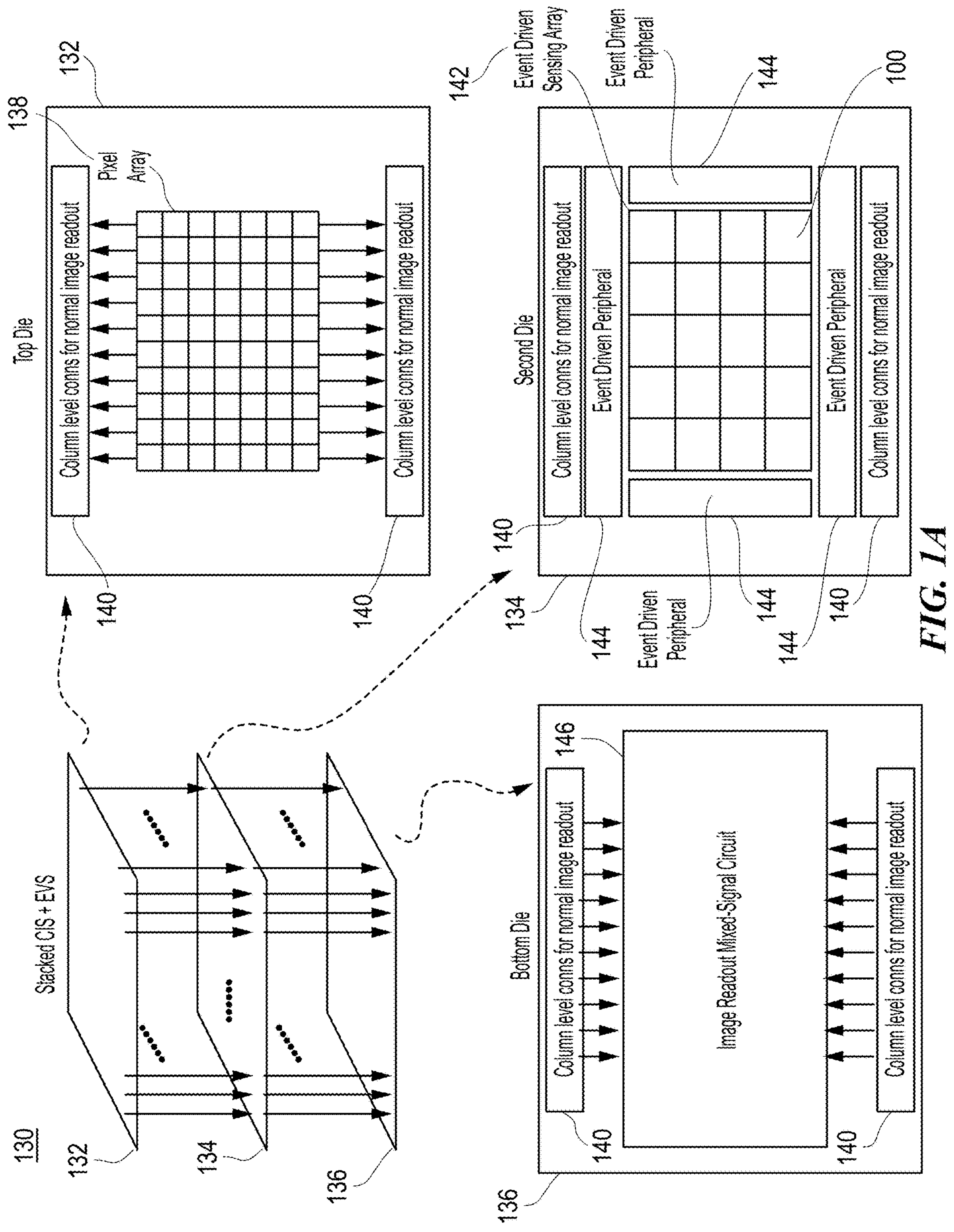
FIG. 1A is a partially schematic diagram of a stacked hybrid complementary metal oxide semiconductor (CMOS) image sensor (CIS) and event-based vision sensor (EVS) system, configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures, or described in detail below, to avoid unnecessarily obscuring the description of various aspects of the present technology.

DETAILED DESCRIPTION

The present disclosure relates to hybrid image sensors and associated systems, devices, and methods. For example, several embodiments of the present technology described in detail below are directed to hybrid image sensors with active pixels (e.g., CMOS image sensor (CIS) pixels) and event vision sensor (EVS) pixels, and to associated methods of operating such hybrid image sensors to address different CIS-to-EVS resolutions. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. OVERVIEW

An active pixel sensor employs an array of pixels that are used to capture intensity images/video of an external scene. More specifically, the pixels are used to obtain CIS information (e.g., intensity information) corresponding to light from the external scene that is incident on the pixels. CIS information obtained during an integration period is read out at the end of the integration period and used to generate a corresponding intensity image of the external scene.

The pixels of an active pixel sensor typically have an integration time that is globally defined. Thus, pixels in an array of an active pixel sensor typically have an identical integration time, and each pixel in the array is typically converted into a digital signal regardless of its content (e.g., regardless of whether there has been a change in an external scene that was captured by a pixel since the last time the pixel was read out). As such, a relatively large amount of memory and power can be required to operate an active pixel sensor at high frame rates. Thus, due in part to memory and power constraints, it is difficult to use an active pixel sensor on its own to obtain intensity images/video of an external scene at ultra-high frame rates.

Moreover, when motion or other changes occur in an external scene during an integration period, motion artifacts can be observed as blurring in the resulting intensity image of the external scene. Blurring can be especially prominent in low light conditions in which longer exposure times are used. As such, active pixel image sensors on their own are not great at obtaining sharp intensity images/video of highly dynamic scenes.

In comparison, event vision sensors (e.g., event driven sensors or dynamic vision sensors) employ EVS pixels that are usable to obtain non-CIS information (e.g., contrast information, intensity changes, event data) corresponding to light from an external scene that is incident on those EVS pixels. Event vision sensors read out an EVS pixel and/or convert a corresponding pixel signal into a digital signal only when the EVS pixel detects a change (e.g., an event) in the external scene. In other words, EVS pixels of an event vision sensor that do not detect a change in the external scene are not read out and/or pixel signals corresponding to such EVS pixels are not converted into digital signals (thereby saving power). Thus, each EVS pixel of an event vision sensor can be independent from other EVS pixels of the event vision sensor, and only EVS pixels that detect a change in the external scene need be read out and/or have their corresponding pixel signals converted into digital signals. As a result, unlike active pixel sensors with synchronous integration times, event vision sensors do not suffer from limited dynamic ranges and are able to accurately capture high-speed motion. Thus, event visions sensors are often more robust than active pixel sensors in low lighting conditions and/or in highly dynamic scenes because they are not affected by under/over exposure or motion blur associated with a synchronous shutter. Stated another way, event vision sensors can be used to provide ultra-high frame rates and to accurately capture high-speed motions.

Hybrid image sensors employ an array of pixels that includes a combination of (i) active (CIS) pixels usable to obtain CIS information corresponding to light from an external scene and (ii) EVS pixels usable to obtain non-CIS information corresponding to light from the external scene. Such hybrid image sensors are therefore able to simultaneously capture (a) intensity images/video of an external scene and (b) events occurring within the external scene. Event data captured by the EVS pixels can be used to resolve/mitigate (i) the low frame-rate intensity image problem discussed above and (ii) the blurry effect inherent in intensity images captured using CIS pixels in the presence of motion. For example, using an event-based double integral (EDI) model, high frame-rate intensity images/video of an external scene can be reconstructed from a single (e.g., blurry) intensity image and its event sequence. A description of the EDI model and how EVS pixels can be used to provide (e.g., on-chip) event-guided deblur and/or rolling shutter distortion correction is provided in (1) the cofiled, copending, and coassigned application titled "HYBRID IMAGE SENSORS WITH ON-CHIP IMAGE DEBLUR"

and (2) the cofiled, copending, and coassigned application titled "HYBRID IMAGE SENSORS WITH ON-CHIP IMAGE DEBLUR AND ROLLING SHUTTER DISTORTION CORRECTION," each of which has been incorporated herein by reference in its entirety above.

Hybrid image sensors often employ a different number of EVS pixels than CIS pixels. More specifically, in an array of pixels within a hybrid image sensor, only a small subset of the pixels are typically employed as EVS pixels to obtain non-CIS information corresponding to light from an external scene while the remaining pixels are typically employed as CIS pixels to obtain CIS information corresponding to light from the external scene. This is because employing a larger number of the pixels as EVS pixels commonly results in a decline in CIS image quality.

As a specific example, consider a 4×4 array of pixels. A hybrid image sensor can employ one of the pixels as an EVS pixel while the remaining pixels are employed as CIS pixels. In this example, when the EVS pixel is used to obtain non-CIS information for the remaining pixels in the 4×4 array (e.g., to perform image deblur, rolling shutter distortion correction, video frame interpolation, etc.), CIS-to-EVS pixel resolution is 15:1. The CIS-to-EVS resolution in this example can alternatively be stated in terms of pixel rows or pixel columns. More specifically, the one EVS pixel is positioned in a single pixel row and a single pixel column of the 4×4 array and can be used to obtain non-CIS information for four rows of CIS pixels and four columns of CIS pixels. Thus, the CIS-to-EVS resolution can be expressed as a CIS-to-EVS pixel row resolution of 4:1 or as a CIS-to-EVS pixel column resolution of 4:1. Such a large CIS-to-EVS resolution mismatch can complicate downstream calculations (e.g., image deblur calculations, rolling shutter distortion calculations, etc.) and/or result in those calculations being less accurate than desired.

Furthermore, continuing with the 4×4 pixel array example above, the 4×4 pixel array can include CIS pixels that correspond to different colors. For example, a first subset of the CIS pixels can correspond to the color red, a second subset of the CIS pixels can correspond to the color green, a third subset of the CIS pixels can correspond to the color blue, and/or a fourth subset of the CIS pixels can correspond to clear (or monochrome in which any color of light is permitted to strike the photodiode corresponding to a CIS pixel). In some instances, the EVS pixel can correspond to clear (or monochrome). In such instances, when non-CIS information obtained by the EVS pixel is used for the remaining CIS pixels of the 4×4 array, it is assumed that events are triggered in every color to which those remaining CIS pixels correspond (which may not be true in every circumstance).

In other instances, the EVS pixel can correspond to only one color (e.g., red, green, or blue). In these instances, when non-CIS information obtained by the EVS pixel is used for the remaining CIS pixels of the 4×4 array, the non-CIS information corresponding to the one color can be used for CIS pixels corresponding to a different color (which can lead to inaccuracies). In still other instances, a 4×4 array can include more than one EVS pixel that correspond to different colors (e.g., red, green, blue, or clear) from one another. In these instances, non-CIS information obtained by the EVS pixels correspond to more than one color, which can lead to inaccuracies when used for the remaining CIS pixels of the 4×4 array that may correspond to the same or different colors.

To address the above concerns, the present technology is generally directed to hybrid image sensors with active pixels (e.g., CMOS image sensor (CIS) pixels) and event vision sensor (EVS) pixels, and to associated methods of operating such hybrid image sensors to address different CIS-to-EVS resolutions. For example, several embodiments of the present technology described in detail below relate to various methods of reducing or eliminating CIS-to-EVS resolution mismatches. In one example, an EVS pixel or EVS pixel row can correspond to clear (or be operated as a monochrome EVS pixel). Continuing with this example, CIS information obtained by CIS pixels corresponding to a specific color (e.g., red, blue, green, or blue) and/or CIS information obtained by CIS pixels corresponding to clear (or operated as monochrome CIS pixels) can be (i) read out from the array by skipping the readout of one or more CIS pixel rows and/or one or more CIS pixel columns and (ii) combined with non-CIS information obtained by the EVS pixel/EVS pixel row (e.g., as part of an image deblur calculation, a rolling shutter distortion calculation, etc.).

In another example, an EVS pixel or EVS pixel row can correspond to red, green, blue, or another color besides clear. Continuing with this example, only CIS information obtained by CIS pixels corresponding to that specific color (e.g., red, blue, green, or the other color besides clear) can be (i) read out from the array by skipping the readout of one or more CIS pixel rows and/or one or more CIS pixel columns and (ii) combined with non-CIS information obtained by the EVS pixel/EVS pixel row (e.g., as part of an image deblur calculation, a rolling shutter distortion calculation, etc.). In other words, in this example, color channels between CIS pixels and EVS pixels can be matched with each other during readout of the CIS pixels.

In still another example, an EVS pixel or EVS pixel row can correspond to clear (or be operated as a monochrome EVS pixel). Continuing with this example, CIS information obtained by CIS pixels corresponding to one or more colors (e.g., red, blue, green, clear) can be binned vertically across CIS pixel rows and/or horizontally across CIS pixel columns to reduce or eliminate CIS-to-EVS pixel resolution mismatch, CIS-to-EVS pixel row resolution mismatch, and/or CIS-to-EVS pixel column resolution mismatch.

In yet another example, an EVS pixel or EVS pixel row can correspond to red, green, or blue (or to another color besides clear/mono). Continuing with this example, CIS information obtained by CIS pixels corresponding to that specific color (e.g., red, blue, green, or the other color besides clear/mono) can be binned vertically across CIS pixel rows and/or horizontally across CIS pixel columns to (a) reduce or eliminate CIS-to-EVS pixel resolution mismatch, CIS-to-EVS pixel row resolution mismatch, and/or CIS-to-EVS pixel column resolution mismatch and (b) match color channels between CIS pixels and EVS pixels.

In still another example, non-CIS information for additional EVS pixel rows and/or additional EVS pixel columns can be interpolated using non-CIS information obtained by EVS pixels of one or more EVS pixel rows and/or EVS pixel columns to reduce or eliminate CIS-to-EVS pixel resolution mismatch, CIS-to-EVS pixel row resolution mismatch, and/or CIS-to-EVS pixel column resolution mismatch. As a specific example, two EVS pixel rows may each include fewer columns of EVS pixels than columns of CIS pixels included in on or more corresponding CIS pixel rows. In such instances, interpolation can be used on non-CIS information obtained by the EVS pixels of the two EVS pixel rows to reduce or eliminate CIS-to-EVS pixel resolution mismatch, CIS-to-EVS pixel row resolution mismatch, and/or CIS-to-EVS pixel column resolution mismatch.

Additional details on hybrid image sensors configured in accordance with various embodiments of the present technology and on various methods of reducing or eliminating CIS-to-EVS resolution mismatches are provided below with reference to FIGS. 1A-8.

B. SELECTED EMBODIMENTS OF HYBRID IMAGE SENSORS AND ASSOCIATED METHODS OF OPERATION

FIG. 1A is a partially schematic diagram of a stacked complementary metal oxide semiconductor (CMOS) image sensor (CIS) with an event-based vision sensor (EVS) system 130 ("the stacked system 130" or "the image sensor 130"), configured in accordance with various embodiments of the present technology. As shown, the stacked system 130 includes a first die 132, a second die 134, and a third die 136 that are stacked and coupled together in a stacked chip scheme. In some embodiments, the first die 132, the second die 134, and the third die 136 are semiconductor dies that include a suitable semiconductor material (e.g., silicon). In illustrated embodiment, the first die 132 (also referred to herein as the "top die") includes a pixel array 138. The third die 136 (also referred to herein as the "bottom die") includes image readout circuitry 146 (also referred to herein as "image readout mixed-signal circuitry"). The image readout circuitry 146 can be coupled to the pixel array 138 of the first die 132 through column level connections for normal image readout 140. In some embodiments, the column level connections for normal image readout 140 are implemented from column bitlines of the pixel array 138 with through silicon vias (TSVs) that extend between the first die 132 and the third die 136, and that are routed through the second die 134.

In some embodiments, the pixel array 138 is a two-dimensional (2D) array including a plurality of pixel cells (also referred to as "pixels") that each includes at least one photosensor (e.g., at least one photodiode) exposed to incident light. As shown in the illustrated embodiment, the pixels are arranged into rows and columns. Some of the pixels can be configured as CMOS image sensor (CIS) pixels that are configured to acquire image data of a person, place, object, etc., which can then be used to render images and/or video of a person, place, object, etc. For example, each CIS pixel is configured to photogenerate image charge in response to the incident light. After each CIS pixel of the pixel array 138 has acquired its image charge, a corresponding analog image charge data can be read out by the image readout circuitry 146 in the third die 136 through the column bit lines. In some embodiments, the image charge from each row of the pixel array 138 may be read out in parallel through column bit lines by the image readout circuitry 146. As discussed in greater detail below, others of the pixels of the pixel array 138 can be configured as event vision sensor (EVS) pixels.

The image readout circuitry 146 in the third die 136 can include amplifiers, analog to digital converter (ADC) circuitry, associated analog support circuitry, associated digital support circuitry, etc., for normal image readout and processing. In some embodiments, the image readout circuitry 146 may also include event driven readout circuitry, which will be described in greater detail below. In operation, the photogenerated analog image charge signals are read out from the pixel cells of pixel array 138, amplified, and converted to digital values in the image readout circuitry 146. In some embodiments, image readout circuitry 146 may read out a row of image data at a time. In other examples, the image readout circuitry 146 may read out the image data using a variety of other techniques (not illustrated), such as a serial readout or a full parallel readout of all pixels simultaneously. The image data may be stored or even manipulated by applying post image effects (e.g., crop, rotate, remove red eye, adjust brightness, adjust contrast, and the like).

In the illustrated embodiment, the second die 134 (also referred to herein as the "middle die") includes an event driven sensing array 142 that is coupled to at least some of the pixels (e.g. EVS pixels) of the pixel array 138 in the first die 132. In some embodiments, the event driven sensing array 142 is coupled to at least some of the pixels of the pixel array 138 through hybrid bonds between the first die 132 and the second die 134. The event driven sensing array 142 can include an array of event driven circuits. In some embodiments, each one of the event driven circuits in the event driven sensing array 142 is coupled to at least one of the plurality of pixels of the pixel array 138 through hybrid bonds between the first die 132 and the second die 134 to asynchronously detect events that occur in light that is incident upon the pixel array 138 in accordance with the teachings of the present disclosure.

In some embodiments, corresponding event detection signals are generated by the event driven circuits in the event driven sensing array 142. The event detection signals can be received and processed by event driven peripheral circuitry 144 that, in some embodiments, is arranged around the periphery of the event driven sensing array 142 in the second die 134, as is shown in FIG. 1A. The embodiment illustrated in FIG. 1A also illustrates column level connections for normal image readout 140 that are routed through the second die 134 between the first die 132 and the third die 136.

Figure 1B:
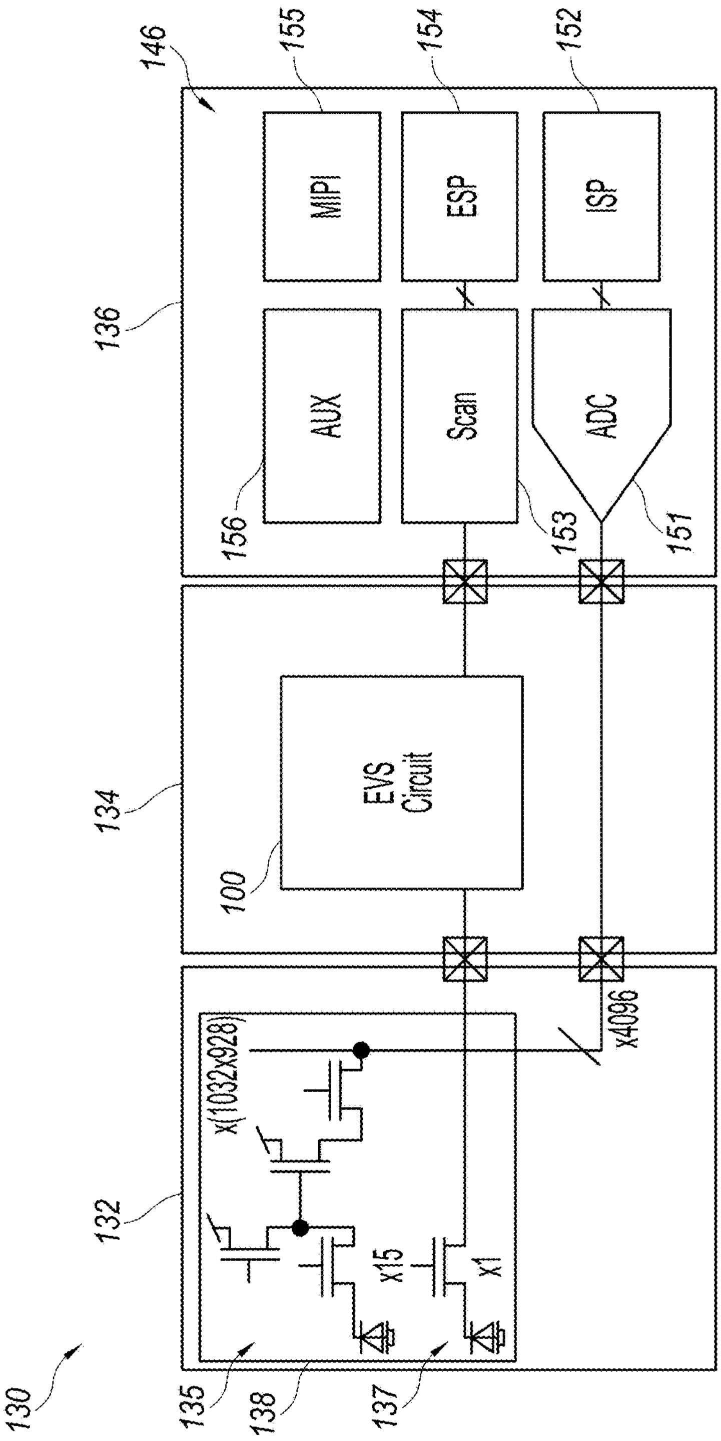
FIG. 1B is a partially schematic diagram of a specific example of the system of FIG. 1A.

FIG. 1B is a partially schematic diagram of a specific example of the stacked system 130 of FIG. 1A. As shown in FIG. 1B, the stacked system 130 includes the pixel array 138 on the first die 132 (only a portion of the pixel array 138 is shown in FIG. 1B), an event driven circuit 100 of the event driven sensing array 142 on the second die 134, and image readout circuitry 146 on the third die 136. The image readout circuitry 146 includes analog-to-digital converters 151 ("the ADC 151"), an image signal processor 152, scan readout circuitry 153, an event signal processor 154, a synchronous communications interface 155 (e.g., a mobility industry processor interfaces (MIPI) transmitter and/or receiver), and various auxiliary circuits 156. As discussed in greater detail below, the image readout circuitry 146 can also include a deblur circuit (e.g., for performing event-guided deblur of CIS data).

Figure 1C:
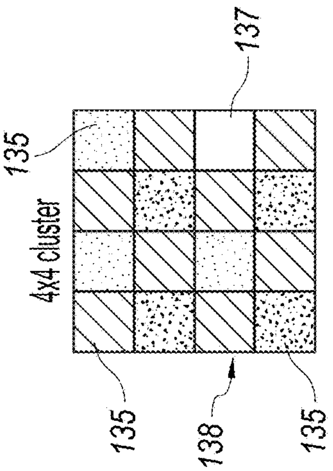
FIG. 1C is a partially schematic diagram of a 4×4 pixel cluster configured in accordance with various embodiments of the present technology.

The portion of the pixel array 138 shown in FIG. 1B corresponds to a 4×4 cluster of pixels in the pixel array 138. Such a cluster can be repeated across the pixel array 138. In the illustrated embodiment, fifteen (15) of the pixels of the cluster are configured as active (CIS) pixels 135 to capture CIS information (e.g., intensity information) corresponding to light incident on photosensors of those pixels. In addition, one of the pixels of the cluster is configured as an EVS pixel 137 to capture non-CIS information (e.g., contrast information, event data) corresponding to light incident on a photosensor of the EVS pixel 137. FIG. 1C illustrates a specific example of the 4×4 pixel cluster of FIG. 1B in which the CIS pixels 135 are arranged in a Bayer pattern to capture CIS (frame) information corresponding to light incident on the cluster, and the EVS pixel 137 is arranged to detect EVS (asynchronous event) information corresponding to light incident on the cluster.

In the illustrated example, the EVS pixel 137 can be positioned beneath a clear color filter. As a result, light of any color can be permitted to pass through the clear color filter and strike a photosensor corresponding to the EVS pixel 137. Stated another way, the EVS pixel 137 can be a monochrome EVS pixel. In other embodiments, the EVS pixel 137 can be positioned beneath a color filter that corresponds to a specific (e.g., only one) color, such as red, green, or blue. Continuing with this example, only light of the specific color can be permitted to pass through the color filter and strike a photosensor corresponding to the EVS pixel 137.

Referring again to FIG. 1B, the CIS pixels 135 of the cluster and the EVS pixel 137 of the cluster are read out independently. More specifically, CIS information captured by the CIS pixels 135 are read out through the second die 134 to the ADC 151 on the third die 136 using corresponding row/column control circuitry (not shown). Non-CIS information captured by the EVS pixel 137 is read out to the event driven circuit 100 on the second die 134 using corresponding row/column control circuitry (not shown), and events detected by the event driven circuit 100 are read out by the scan readout circuitry 153 on the third die 136. The CIS information captured by the CIS pixels 135 of the pixel array 138 is frame-based and can be readout out from the CIS pixels 135 row-by-row (or using another technique) at the end of an exposure period. By contrast, the non-CIS information captured by the EVS pixel 137 is used by the event driven circuit 100 to asynchronously detect/triggers events, and the events can be read out according to a row scan readout scheme or a column scan readout scheme. Examples of row scan readout schemes are discussed in detail in (1) cofiled, copending, and coassigned application titled "HYBRID IMAGE SENSORS WITH ON-CHIP IMAGE DEBLUR" and (2) cofiled, copending, and coassigned application titled "HYBRID IMAGE SENSORS WITH ON-CHIP IMAGE DEBLUR AND ROLLING SHUTTER DISTORTION CORRECTION," each of which has been incorporated herein by reference in its entirety above.

In some embodiments, row/column control circuitry corresponding to the CIS pixels 135 can be allocated on a same die as—or a different die from—the die (e.g., the third die 136) on which the ADC 151 is allocated. In these and other embodiments, row/column control circuitry corresponding to the EVS pixels 137 can be allocated on a same die as—or a different die from—the die (e.g., the third die 136) on which the scan readout circuitry 153 is allocated. In these and still other embodiments, the ADC 151 and/or the row/column control circuitry corresponding to the CIS pixels 135 can be allocated on a same die as—or a different die from—the die (e.g., the third die 136) on which the scan readout circuitry 153 and/or the row/column control circuitry corresponding to the EVS pixel 137 is/are allocated.

In the illustrated embodiment, the EVS pixel 137 is dedicated to capturing non-CIS (EVS) information while the CIS pixels 135 are dedicated to capturing CIS information. In other embodiments, the EVS pixel 137 and/or one or more of the CIS pixels 135 can be switched between being configured to capture CIS information and non-CIS information. This can enable the stacked system 130 to operate in a CIS-only mode in which all of the pixels 135 and the pixel 137 are used to capture CIS information, an EVS-only mode in which all of the pixels 135 and the pixel 137 are used to capture non-CIS (EVS) information, and/or a hybrid CIS and EVS mode in which a first subset of the pixels 135, 137 are used to capture CIS information and a second subset of the pixels 135, 137 are used to capture non-CIS (EVS) information.

In some embodiments, the event driven circuit 100 on the second die 134 has a same die size as the 4×4 pixel cluster on the first die 132. In other embodiments, the event driven circuit 100 can have a different die size from the 4×4 pixel cluster. Additionally, or alternatively, although the ratio of CIS pixels to EVS pixels is 15:1 in the 4×4 pixel cluster, other ratios of CIS pixels to EVS pixels (e.g., 14:2, 12:4, 8:8, 4:12, 2:14, 15:1) are possible and fall within the scope of the present technology. Moreover, although the EVS pixel 157 of FIG. 1B corresponds to a 4×4 pixel cluster, other arrangements (e.g., an EVS pixel corresponding to 1×1 pixels clusters, 4×2 pixel clusters, etc.) are possible and within the scope of the present technology. Furthermore, although one row of EVS pixels (e.g., the row including the EVS pixel 157) corresponds to four rows of CIS pixels in FIG. 1B, other arrangements are possible and within the scope of the present technology. For example, each row of EVS pixels can correspond to (a) one row of CIS pixels, (b) to two rows of CIS pixels, (c) to three rows of CIS pixels, or (d) to more than four rows of CIS pixels.

Figure 2:
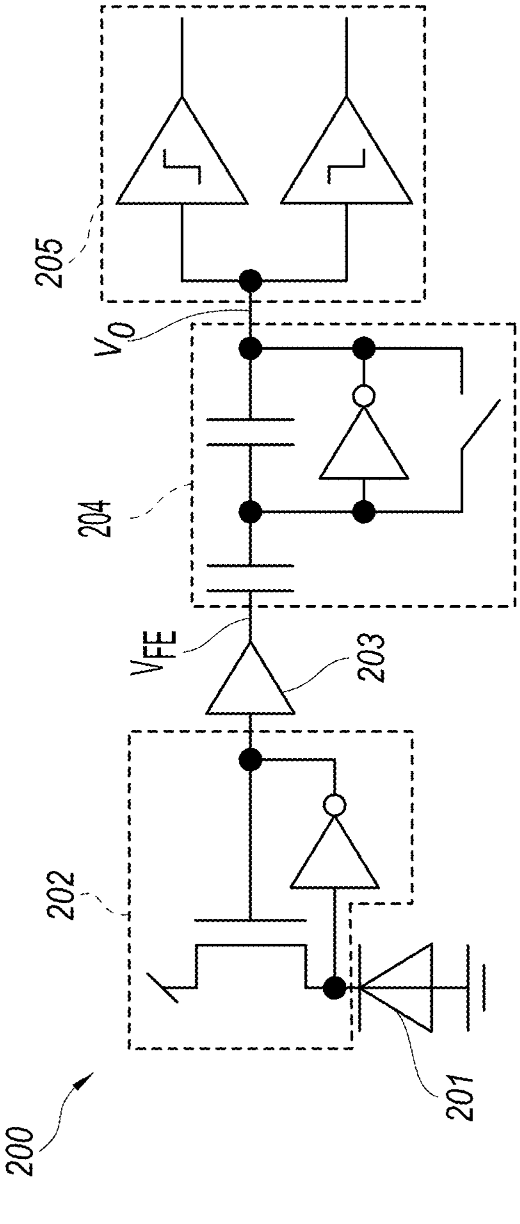
FIG. 2 is a partially schematic diagram of an EVS pixel configured in accordance with various embodiments of the present technology.

FIG. 2 is a partially schematic diagram of an EVS pixel 200 configured in accordance with various embodiments of the present technology. The EVS pixel 200 is also referred to herein as an "event sensing front-end circuit." It is appreciated that the EVS pixel 200 can be an example of one of the event driven circuits in the event driven sensing array 142 of FIG. 1A, the event driven circuit 100 of FIG. 1B, or of other EVS pixels configured in accordance with various embodiments of the present technology. As shown, the EVS pixel 200 includes a photosensor 201, a logarithmic amplifier 202, a buffer 203, a difference detector 204, and up/down comparators 205.

The photosensor 201 is configured to photogenerate image charge (photocurrent) in response to incident light. Photocurrent photogenerated by the photosensor 201 is fed into the logarithmic amplifier 202. In turn, the logarithmic amplifier 202 transduces the photocurrent into a voltage $V_{FE}$.

The difference detector 204 of the EVS pixel 200 is used to monitor temporal contrast of light incident on the photosensor 201. More specifically, when reset, the difference detector 204 samples the voltage $V_{FE}$ at a reference time to and thereafter generates an output $V_O$. The output $V_O$ of the difference detector 204 thereafter tracks a change of the voltage $V_{FE}$ over time relative to the voltage $V_{FE}$ at the reference time to.

The output $V_O$ of the difference detector 204 is fed into the up/down comparators 205. In turn, the up/down comparators 205 compare the output $V_O$ to corresponding threshold voltages $V_{+TH}$ and $V_{-TH}$. The up comparator detects an event when the output $V_O$ of the difference detector 204 exceeds the threshold voltage $V_{+TH}$. The down comparator detects an event when the output $\Delta V_O$ of the difference detector 204 is less than the threshold voltage $V_{-TH}$. When an event is triggered in the EVS pixel 200, the event can be readout of the EVS pixel 200 and the difference detector 204 can be reset such that the difference detector 204 newly samples the voltage $V_{FE}$. In this manner, the EVS pixel 200 can be employed to detect events (e.g., motion) occurring within an external scene.

As discussed above, hybrid image sensors often employ EVS pixels to obtain non-CIS information that can be combined with CIS information captured by corresponding CIS pixels, such as to perform image deblurring, rolling shutter distortion correction, etc. on the CIS information. Although often arranged in EVS pixel rows and EVS pixel columns, the EVS pixels can be spread out across pixel arrays of the hybrid image sensors and interspersed amongst a greater number of CIS pixels that are arranged in a greater number of CIS pixel rows and/or a greater number of CIS pixel columns. Each EVS pixel, EVS pixel row, and/or EVS pixel column can therefore correspond to one or more CIS pixels, CIS pixel rows, and/or CIS pixel columns, respectively. Accordingly, there can be a mismatch in CIS-to-EVS resolutions in such hybrid image sensors.

Figures 3, 4:
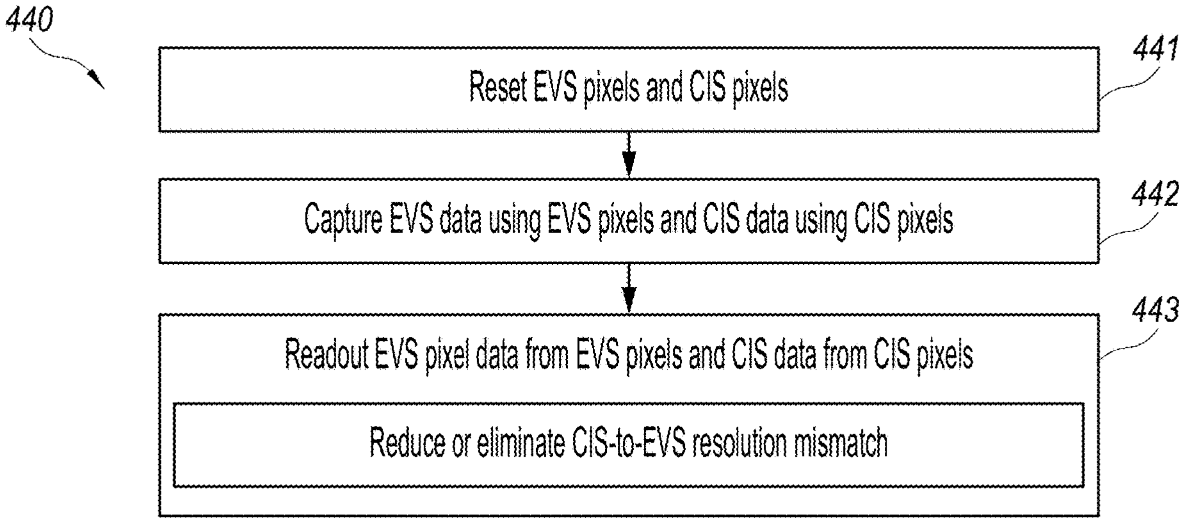
FIG. 3 is a table illustrating an example CIS-to-EVS pixel row correspondence in accordance with various embodiments of the present technology.
FIG. 4 is a flow diagram illustrating a method of operating an imaging system including a hybrid image sensor in accordance with various embodiments of the present technology.

For example, FIG. 3 is a table 330 illustrating an example CIS-to-EVS pixel row correspondence in accordance with various embodiments of the present technology. As shown, three EVS pixels rows (EVS pixel row N, EVS pixel row N+1, and EVS pixel row N+2) correspond to twelve CIS pixel rows (CIS pixel row 4N through CIS pixel row 4N+11). More specifically, EVS pixels of EVS pixel row N are employed to capture non-CIS information for CIS pixels of CIS pixel row 4N, CIS pixel row 4N+1, CIS pixel row 4N+2, and CIS pixel row 4N+3. Similarly, EVS pixels of EVS pixel row N+1 are employed to capture non-CIS information for CIS pixels of CIS pixel row 4N+4, CIS pixel row 4N+5, CIS pixel row 4N+6, and CIS pixel row 4N+7; and EVS pixels of EVS pixel row N+2 are employed to capture non-CIS information for CIS pixels of CIS pixel row 4N+8, CIS pixel row 4N+9, CIS pixel row 4N+10, and CIS pixel row 4N+11. Thus, each EVS pixel row can correspond to a greater number of CIS pixel rows.

In these and other embodiments, the number of EVS pixels in the EVS pixel rows can differ from the number of CIS pixels in one or more of the corresponding CIS pixel rows. For example, the EVS pixel row N can include a first number of EVS pixels that differs from a number of CIS pixels included in CIS pixel row 4N, CIS pixel row 4N+1, CIS pixel row 4N+2, and/or CIS pixel row 4N+3. In such instances, a number of EVS pixel columns in the EVS pixel row N can differ from a number of CIS pixel columns included in CIS pixel row 4N, CIS pixel row 4N+1, CIS pixel row 4N+2, and/or CIS pixel row 4N+3.

Additionally, or alternatively, EVS pixels in the EVS pixel rows can correspond to different colors than one or more CIS pixels of one or more corresponding CIS pixel rows. For example, the EVS pixel row N can include a first EVS pixel that corresponds to clear (or monochrome) and/or a second EVS pixel that corresponds to a specific color (e.g., red, green, or blue). Continuing with this example, one or more CIS pixels of the CIS pixel row 4N can correspond to a different color from the first EVS pixel and/or the second EVS pixel. As a result, there can be a mismatch between EVS color channels and CIS color channels.

Methods of operating hybrid imaging systems to reduce or eliminate CIS-to-EVS resolution mismatch and/or color channel mismatch are described in detail below with reference to FIGS. 4-8. More specifically, FIG. 4 is a flow diagram illustrating a method 440 of operating an imaging system including a hybrid image sensor in accordance with various embodiments of the present technology. For example, the method 440 can be a method of reducing, minimizing, or eliminating CIS-to-EVS resolution mismatch (e.g., matching, better matching, aligning, better aligning CIS data resolution to EVS data resolution) and/or a method of reducing, minimizing, or eliminating mismatch between EVS color channels and CIS color channels. The method 440 is illustrated as a series of blocks 441-443 or steps. All or a subset of one or more of the blocks 441-443 can be executed by devices or components of the imaging system, such as device or components of the hybrid image sensor. For example, all or a subset of one or more of the blocks 441-443 can be performed by CIS pixels of a pixel array, EVS pixels of an event driven sensing array, and/or control circuitry (e.g., a common control block, row/column control circuitry, column readout circuitry, column-scan readout circuitry, row scan readout circuitry, etc.) of the hybrid image sensor and/or of the imaging system. All or a subset of one or more of the blocks 441-443 of the method 440 can be executed in accordance with the description of FIGS. 1-3 above and/or with the description below. Indeed, block 442 of the method 440 is described below with reference to FIG. 3, and block 443 of the method 440 is described below with reference to FIGS. 5A-8.

The method 440 begins at block 441 by resetting one or more EVS pixels and/or one or more CIS pixels of a pixel array. In some embodiments, resetting the EVS pixel(s) and/or CIS pixel(s) can include aligning CIS pixel data with corresponding EVS pixel data. Aligning the CIS pixel data with the corresponding EVS pixel data can include aligning/synchronizing the timings of exposure period(s) of one or more rows of CIS pixels with event accumulation period(s) of one or more corresponding EVS pixels. Additional details on aligning/synchronizing the timings of exposure period(s) of one or more rows of CIS pixels with event accumulation period(s) of one or more corresponding EVS pixels are provided in the cofiled, copending, and coassigned application titled "HYBRID IMAGE SENSORS WITH ON-CHIP IMAGE DEBLUR," which has been incorporated herein by reference in its entirety above.

At block 442, the method 440 continues by (a) capturing CIS data using CIS pixels during corresponding exposure periods and (b) capturing EVS data using EVS pixels. Referring again to FIG. 3 for the sake of example, CIS pixels of CIS pixel row 4N through CIS pixel row 4N+3 that correspond to EVS pixel row N can integrate photogenerated charge in the CIS pixels during a corresponding exposure period. Simultaneously, the EVS pixel(s) of the EVS pixel row N can asynchronously detect events during a corresponding and simultaneously occurring EVS accumulation period that shares a same start time and stop time as the exposure period for the CIS pixels of CIS pixel row 4N though CIS pixel row 4N+3.

At block 443, the method 440 continues by reading out events detected by the EVS pixels of the event driven sensing array and reading out CIS data obtained using one or more of the CIS pixels. At least part of block 443 can be performed while performing block 442. For example, when an EVS pixel detects an event, the event can be read out from the EVS pixel. When an event detected by an EVS pixel is read out from the EVS pixel, the EVS pixel can be reset and thereby enabled to detect subsequent events.

A single EVS pixel may detect hundreds of events over a single event accumulation period. Therefore, for a single CIS frame, a relatively large amount of EVS data can be generated. Such a large amount of EVS data can, in some cases, complicate and/or slow down computations (e.g., deblur computations) performed by the image sensor and/or a downstream processor, which may not be appropriate or acceptable for certain applications. Therefore, in some embodiments, EVS data can be readout of EVS pixels using a row-by-row scan readout. More specifically, the image sensor can scan/step through the event driven sensing array row-by-row and spend a uniform amount of time reading out each EVS pixel row. In this manner, the scan readout can limit a number of EVS readouts per CIS frame, which can simplify and/or speed up computations downstream computations. Additional details on row-by-row scan readout techniques are provided in the cofiled, copending, and coassigned application titled "HYBRID IMAGE SENSORS WITH ON-CHIP IMAGE DEBLUR," which has been incorporated herein by reference in its entirety above.

In some embodiments, reading out CIS data obtained using one or more CIS pixels can include reading out the CIS data from the CIS pixels in rows or groups of rows. For example, in embodiments in which multiple CIS pixel rows correspond to a same EVS pixel row, CIS data captured by CIS pixels of the multiple CIS pixel rows can be read out together/at the same time at or after the end of the corresponding exposure period.

Figure 5A:
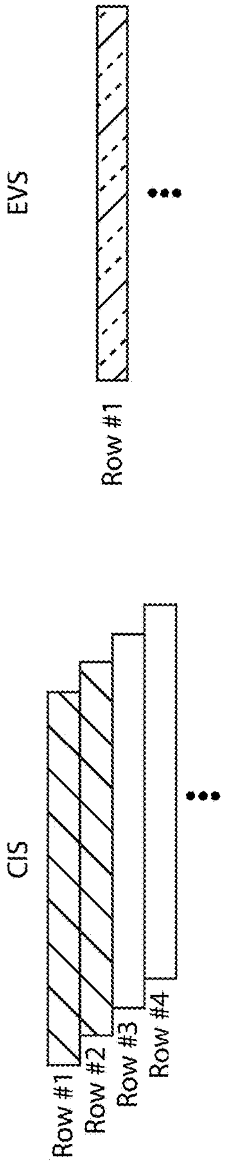
FIGS. 5A-5C are partially schematic diagrams illustrating a method of reducing or eliminating CIS-to-EVS resolution mismatch in accordance with various embodiments of the present technology.
Figure 5B:
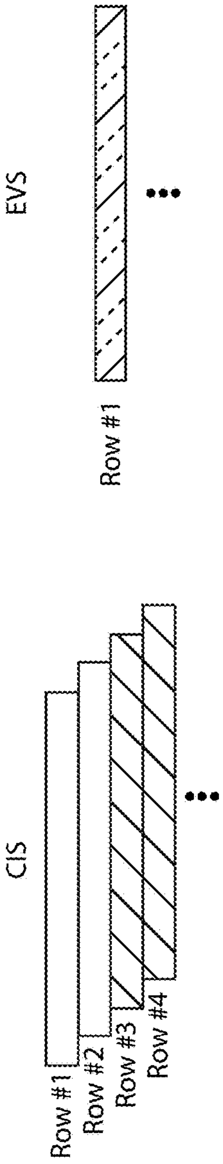
Figure 5C:
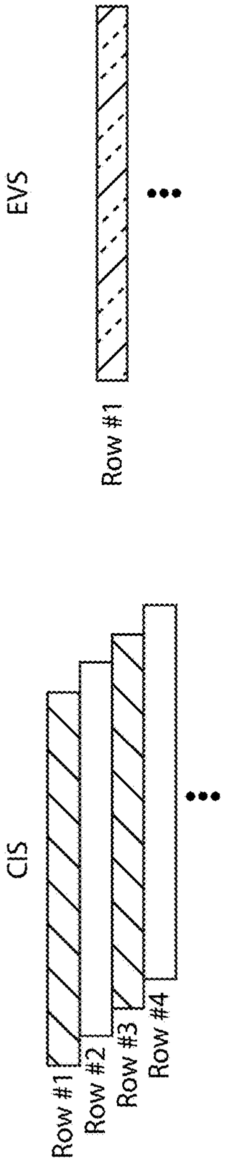

In these and other embodiments reading out EVS pixel data and reading out CIS data can include reducing, minimizing, or eliminating CIS-to-EVS resolution mismatch and/or a mismatch between CIS color channels and EVS color channels. For example, reading out CIS data from CIS pixels of a pixel array can include skipping readout of one more CIS pixel rows and/or one or more CIS pixel columns, such as to reduce resolution of the CIS data, to match a resolution of EVS data captured by corresponding EVS pixels, and/or to reduce, minimize, or eliminate a mismatch between resolution of CIS data captured by CIS pixels and resolution of EVS data captured by corresponding EVS pixels. FIGS. 5A-5C illustrate three such examples in accordance with various embodiments of the present technology. In FIGS. 5A-5C, EVS pixels of EVS pixel row #1 correspond to CIS pixels of CIS pixel row #1 through CIS pixel row #4. In addition, in the illustrated examples, EVS pixels of EVS pixel row #1 are operated as monochrome pixels (e.g., correspond to clear) such that light of any color is permitted to strike one or more photosensors corresponding to the EVS pixels. The CIS pixels of CIS pixel row #1 through CIS pixel row #4 can include CIS pixels that correspond to a specific color (e.g., red, blue, green, etc.) and/or CIS pixels that are operated as monochrome pixels (e.g., correspond to clear).

Referring first to FIG. 5A, although CIS pixel row #1 through CIS pixel row #4 each correspond to EVS pixel row #1, only CIS pixels of CIS pixel row #1 and CIS pixel row #2 are read out. Stated another way, readout of CIS pixels of CIS pixel row #3 and CIS pixel row #4 can be skipped. As a result, resolution of CIS data captured by CIS pixels corresponding to EVS pixels of EVS pixel row #1 can be reduced so as to reduce, minimize, and/or eliminate a mismatch between the resolution of CIS data and the resolution of corresponding EVS data obtained by EVS pixels of EVS pixel row #1. As discussed above, the CIS pixels of CIS pixel row #1 and CIS pixel row #2 can include CIS pixels that correspond to a specific color (e.g., red, blue, green, etc.) and/or CIS pixels that are operated as monochrome pixels (e.g., correspond to clear).

Referring now to FIG. 5B, only CIS pixels of CIS pixel row #3 and CIS pixel row #4 are read out. Stated another way, in contrast with the example illustrated in FIG. 5A, readout of CIS pixels of CIS pixel row #1 and CIS pixel row #2 can be skipped. As a result, resolution of CIS data captured by CIS pixels corresponding to EVS pixels of EVS pixel row #1 can be reduced so as to reduce, minimize, and/or eliminate a mismatch between the resolution of CIS data and the resolution of corresponding EVS data obtained by EVS pixels of EVS pixel row #1. As discussed above, the CIS pixels of CIS pixel row #3 and CIS pixel row #4 can include CIS pixels that correspond to a specific color (e.g., red, blue, green, etc.) and/or CIS pixels that are operated as monochrome pixels (e.g., correspond to clear). In a specific example, the CIS pixels of CIS pixel row #3 and CIS pixel row #4 can include only CIS pixels that correspond to a specific color (e.g., red, blue, green, etc.) even though the EVS pixels of EVS pixel row #1 are operated as monochrome EVS pixels.

Referring now to FIG. 5C, only CIS pixels of CIS pixel row #1 and CIS pixel row #3 are read out. Stated another way, in contrast with the example illustrated in FIGS. 5A and 5B, readout of CIS pixels of CIS pixel row #2 and CIS pixel row #4 can be skipped. As a result, resolution of CIS data captured by CIS pixels corresponding to EVS pixels of EVS pixel row #1 can be reduced so as to reduce, minimize, and/or eliminate a mismatch between the resolution of CIS data and the resolution of corresponding EVS data obtained by EVS pixels of EVS pixel row #1. As discussed above, the CIS pixels of CIS pixel row #1 and CIS pixel row #3 can include CIS pixels that correspond to a specific color (e.g., red, blue, green, etc.) and/or CIS pixels that are operated as monochrome pixels (e.g., correspond to clear). In a specific example, the CIS pixels of CIS pixel row #1 and CIS pixel row #3 can include only CIS pixels that correspond to a specific color (e.g., red, blue, green, etc.) even though the EVS pixels of EVS pixel row #1 are operated as monochrome EVS pixels.

Other readout skipping techniques than shown in FIGS. 5A-5C are possible and within the scope of the present technology. For example, only CIS pixels of CIS pixel row #2 and CIS pixel row #4 can be read out while the readout of CIS pixels of CIS pixel row #1 and CIS pixel row #3 can be skipped. As another example, readout of one or more columns of CIS pixels in CIS pixel row #1 to CIS pixel row #4 can be skipped in addition to or in lieu of skipping readout of one or more CIS pixels rows in CIS pixel row #1 to CIS pixel row #4. Skipping readout of one or more CIS pixel columns is also expected to reduce, minimize, and/or eliminate mismatch between CIS-to-EVS pixel resolution and/or CIS-to-EVS pixel column resolution.

Figure 6A:
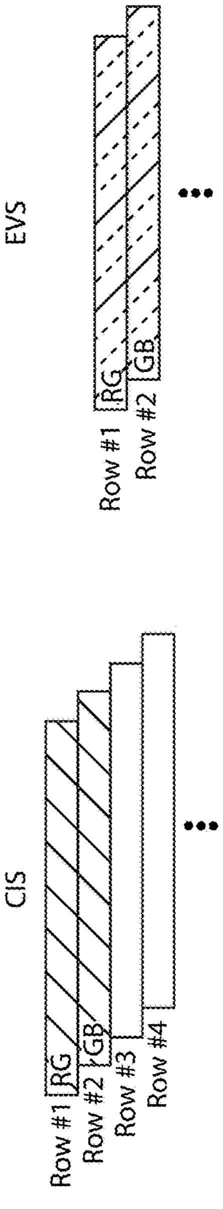
FIGS. 6A-6C are partially schematic diagrams illustrating another method of reducing or eliminating CIS-to-EVS resolution mismatch in accordance with various embodiments of the present technology.
Figure 6B:
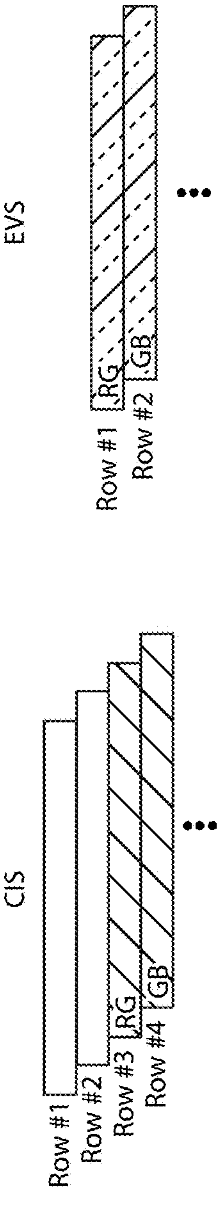
Figure 6C:
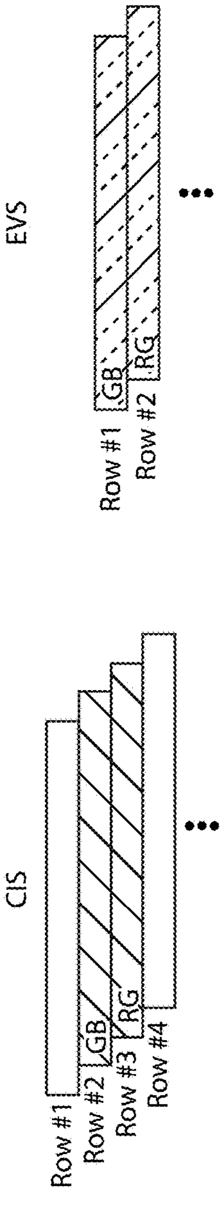

FIGS. 6A-6C illustrate three additional examples of skipping readout of one more CIS pixel rows and/or one or more CIS pixel columns (e.g., to reduce resolution of the CIS data, to match a resolution of EVS data captured by corresponding EVS pixels, and/or to reduce, minimize, or eliminate a mismatch between resolution of CIS data captured by CIS pixels and resolution of EVS data captured by corresponding EVS pixels) in accordance with various embodiments of the present technology. In FIGS. 6A-6C, EVS pixels of EVS pixel row #1 and EVS pixel row #2 correspond to CIS pixels of CIS pixel row #1 through CIS pixel row #4. In addition, in the illustrated examples, EVS pixels of EVS pixel row #1 and EVS pixel row #2 correspond to specific colors (e.g., red, green, and/or blue) such that only light of that/those specific color(s) is permitted to strike one or more photosensors corresponding to the EVS pixels. The CIS pixels of CIS pixel row #1 through CIS pixel row #4 can include CIS pixels that correspond to specific colors (e.g., red, blue, green, etc.) and/or CIS pixels that are operated as monochrome pixels (e.g., correspond to clear). As a specific example, the CIS pixels of CIS pixel row #1 through CIS pixel row #4 and the EVS pixels of EVS pixel row #1 and EVS pixel row #2 illustrated in FIGS. 6A-6B are arranged in a Bayer pattern. It will be appreciated that a Bayer pattern is being used merely as an example. Indeed, in other embodiments, the EVS pixels and/or the CIS pixels can be arranged in any other suitable color filter array pattern and/or may correspond to colors besides red, green, and blue.

Referring first to FIG. 6A, although CIS pixel row #1 through CIS pixel row #4 each correspond to EVS pixel row #1 and EVS pixel row #2, only CIS pixels of CIS pixel row #1 and CIS pixel row #2 are read out. Stated another way, readout of CIS pixels of CIS pixel row #3 and CIS pixel row #4 can be skipped (e.g., to reduce, minimize, and/or eliminate a CIS-to-EVS resolution mismatch). In addition, in contrast with the example discussed above with reference to FIG. 5A, only CIS pixels of CIS pixel row #1 and CIS pixel row #2 that correspond to color(s) matching the color(s) to which the EVS pixels of EVS pixel row #1 and EVS pixel row #2 correspond are readout. In particular, in the illustrated example, EVS pixels of EVS pixel row #1 correspond to red and green. Thus, only those CIS pixels in CIS pixel row #1 that correspond to red and green (which may be all or a subset of the CIS pixels included in CIS pixel row #1) are read out such that the color channels that are read out of CIS pixel row #1 match the color channels of the EVS pixels of EVS pixel row #1. In addition, in the illustrated example, EVS pixels of EVS pixel row #2 correspond to green and blue. Thus, only those CIS pixels in CIS pixel row #2 that correspond to green and blue (which may be all or a subset of the CIS pixels included in CIS pixel row #2) are read out such that the color channels that are read out of CIS pixel row #2 match the color channels of the EVS pixels of EVS pixel row #2. Such readout in the example illustrated in FIG. 6A can be achieved by skipping readout of one or more CIS pixels in one or more CIS pixel rows and/or one or more CIS pixel columns.

Referring now to FIG. 6B, although CIS pixel row #1 through CIS pixel row #4 each correspond to EVS pixel row #1 and EVS pixel row #2, only CIS pixels of CIS pixel row #3 and CIS pixel row #4 are read out. Stated another way, readout of CIS pixels of CIS pixel row #1 and CIS pixel row #2 can be skipped (e.g., to reduce, minimize, and/or eliminate a CIS-to-EVS resolution mismatch). In addition, in contrast with the example discussed above with reference to FIG. 5B, only CIS pixels of CIS pixel row #3 and CIS pixel row #4 that correspond to color(s) matching the color(s) to which the EVS pixels of EVS pixel row #1 and EVS pixel row #2 correspond are readout. In particular, in the illustrated example, EVS pixels of EVS pixel row #1 correspond to red and green. Thus, only those CIS pixels in CIS pixel row #3 that correspond to red and green (which may be all or a subset of the CIS pixels included in CIS pixel row #1) are read out such that the color channels that are read out of CIS pixel row #3 match the color channels of the EVS pixels of EVS pixel row #1. In addition, in the illustrated example, EVS pixels of EVS pixel row #2 correspond to green and blue. Thus, only those CIS pixels in CIS pixel row #4 that correspond to green and blue (which may be all or a subset of the CIS pixels included in CIS pixel row #4) are read out such that the color channels that are read out of CIS pixel row #4 match the color channels of the EVS pixels of EVS pixel row #2. Such readout in the example illustrated in FIG. 6B can be achieved by skipping readout of one or more CIS pixels in one or more CIS pixel rows and/or one or more CIS pixel columns.

Referring now to FIG. 6C, although CIS pixel row #1 through CIS pixel row #4 each correspond to EVS pixel row #1 and EVS pixel row #2, only CIS pixels of CIS pixel row #2 and CIS pixel row #3 are read out. Stated another way, readout of CIS pixels of CIS pixel row #1 and CIS pixel row #4 can be skipped (e.g., to reduce, minimize, and/or eliminate a CIS-to-EVS resolution mismatch). In addition, only CIS pixels of CIS pixel row #2 and CIS pixel row #3 that correspond to color(s) matching the color(s) to which the EVS pixels of EVS pixel row #1 and EVS pixel row #2 correspond are readout. In particular, in the illustrated example, EVS pixels of EVS pixel row #1 correspond to green and blue. Thus, only those CIS pixels in CIS pixel row #2 that correspond to green and blue (which may be all or a subset of the CIS pixels included in CIS pixel row #2) are readout such that the color channels that are read out of CIS pixel row #2 match the color channels of the EVS pixels of EVS pixel row #1. In addition, in the illustrated example, EVS pixels of EVS pixel row #2 correspond to red and green. Thus, only those CIS pixels in CIS pixel row #3 that correspond to red and green (which may be all or a subset of the CIS pixels included in CIS pixel row #3) are readout such that the color channels that are read out of CIS pixel row #3 match the color channels of the EVS pixels of EVS pixel row #2. Such readout in the example illustrated in FIG. 6C can be achieved by skipping readout of one or more CIS pixels in one or more CIS pixel rows and/or one or more CIS pixel columns.

Other readout skipping techniques than shown in FIGS. 6A-6C are possible and within the scope of the present technology. For example, only CIS pixels of CIS pixel row #1 and CIS pixel row #4 can be read out while the readout of CIS pixels of CIS pixel row #2 and CIS pixel row #3 can be skipped. As another example, only CIS pixels of CIS pixel row #1 and CIS pixel row #3 can be read out while the readout of CIS pixels of CIS pixel row #2 and CIS pixel row #4 can be skipped. As still another example, only CIS pixels of CIS pixel row #2 and CIS pixel row #4 can be read out while the readout of CIS pixels of CIS pixel row #1 and CIS pixel row #3 can be skipped. In any of these additional examples, CIS pixels can be readout such that CIS color channels that are read out match the color channels of corresponding EVS pixels.

Figure 7A:
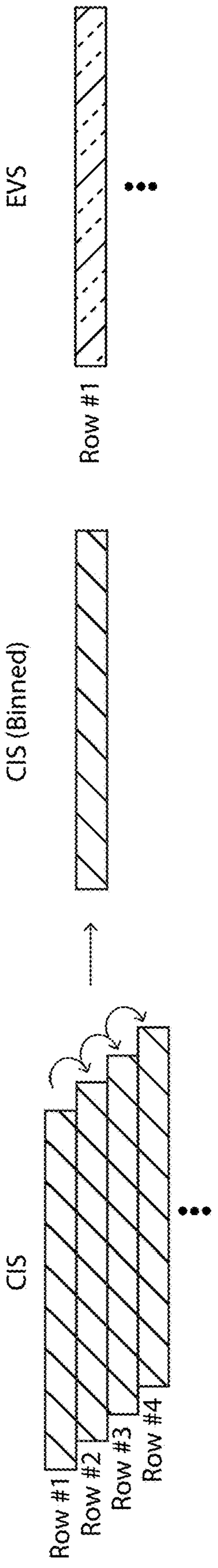
FIGS. 7A and 7B are partially schematic diagrams illustrating still another method of reducing or eliminating CIS-to-EVS resolution mismatch in accordance with various embodiments of the present technology.
Figure 7B:
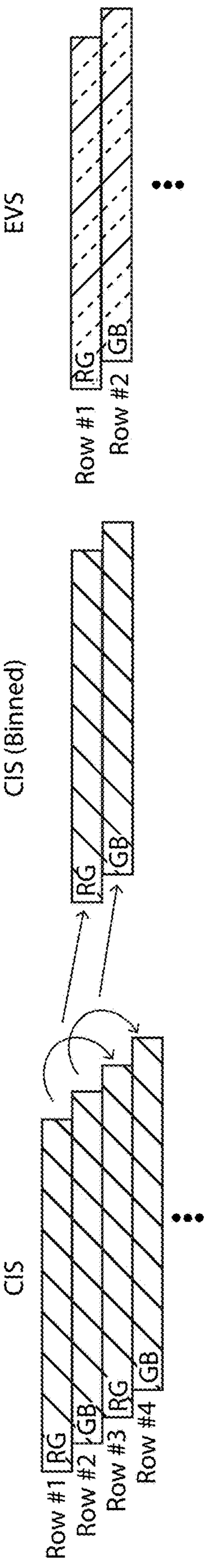

In addition to or in lieu of skipping readout of one or more CIS pixels, one or more CIS pixel rows, and/or one or more CIS pixels, reducing, minimizing, or eliminating CIS-to-EVS resolution mismatch and/or a mismatch between CIS color channels and EVS color channels at block 443 of the method 440 of FIG. 4 can include binning one or more rows and/or columns of CIS pixels. FIGS. 7A and 7B illustrate two such examples in accordance with various embodiments of the present technology.

Referring first to FIG. 7A, EVS pixels of EVS pixel row #1 correspond to CIS pixels of CIS pixel row #1 through CIS pixel row #4. In addition, EVS pixels of EVS pixel row #1 are operated as monochrome pixels (e.g., correspond to clear) such that light of any color is permitted to strike one or more photosensors corresponding to the EVS pixels. CIS data obtained by one or more CIS pixels of one or more of the CIS pixel rows #1 through #4 can be vertically binned to reduce, minimize, or eliminate CIS-to-EVS resolution mismatch. In the specific example illustrated in FIG. 7A, CIS data obtained using CIS pixels of all four of the CIS pixels rows #1 through #4 is vertically binned such that the resolution of the CIS data better aligns and/or matches with the resolution of EVS data obtained using EVS pixels of EVS pixel row #1. Additionally, or alternatively, CIS data obtained using CIS pixels of one or more of the CIS pixel rows #1 through #4 can be horizontally binned. Horizontal binning can, for example, reduce, minimize, or eliminate a CIS-to-EVS pixel column mismatch, such as in scenarios in which there are fewer columns of EVS pixels in EVS pixel row #1 than columns of CIS pixels in one or more of CIS pixel rows #1 through #4.

Referring now to FIG. 7B, EVS pixels of EVS pixel row #1 and EVS pixel row #2 correspond to specific colors (e.g., red, green, and/or blue) such that only light of that/those specific color(s) is permitted to strike one or more photosensors corresponding to the EVS pixels. More specifically, EVS pixels of EVS pixel row #1 correspond to red and green, and EVS pixels of EVS pixel row #2 correspond to green and blue. In the illustrated example, the CIS pixels of CIS pixel row #1 through CIS pixel row #4 can include CIS pixels that correspond to specific colors (e.g., red, green, and/or blue). More specifically, CIS pixels of CIS pixel rows #1 and #3 correspond to red and green, and CIS pixels of CIS pixel rows #2 and #4 correspond to green and blue. As a specific example, the CIS pixels of CIS pixel row #1 through CIS pixel row #4 and the EVS pixels of EVS pixel row #1 and EVS pixel row #2 illustrated in FIG. 7B are arranged in a Bayer pattern. It will be appreciated that a Bayer pattern is being used merely as an example. Indeed, in other embodiments, the EVS pixels and/or the CIS pixels can be arranged in any other suitable color filter array pattern and/or may correspond to colors besides red, green, and blue.

As shown in the illustrated example, CIS data obtained by one or more CIS pixels of CIS pixel rows #1 and #3 can be vertically binned to reduce, minimize, or eliminate CIS-to-EVS resolution mismatch between CIS data captured by CIS pixels of these CIS pixel rows and EVS data obtained using EVS pixels of EVS pixel row #1. As also shown, this binning scheme can ensure that the color channels that are read out of CIS pixel rows #1 and #3 match the color channels of the EVS pixels of EVS pixel row #1. In addition, CIS data obtained by one or more CIS pixels of CIS pixel rows #2 and #4 can be vertically binned to reduce, minimize, or eliminate CIS-to-EVS resolution mismatch between CIS data captured by CIS pixels of these CIS pixel rows and EVS data obtained using EVS pixels of EVS pixel row #2. As shown, this binning scheme can ensure that the color channels that are read out of CIS pixel rows #2 and #4 match the color channels of the EVS pixels of EVS pixel row #2. Similar to the example discussed above with reference to FIG. 7A, CIS data obtained using CIS pixels of one or more of the CIS pixel rows #1 through #4 can be horizontally binned in addition to or in lieu of vertical binning. Horizontal binning can, for example, reduce, minimize, or eliminate a CIS-to-EVS pixel column mismatch, such as in scenarios in which there are fewer columns of EVS pixels in EVS pixel row #1 than columns of CIS pixels in one or more of CIS pixel rows #1 through #4.

Figure 8:
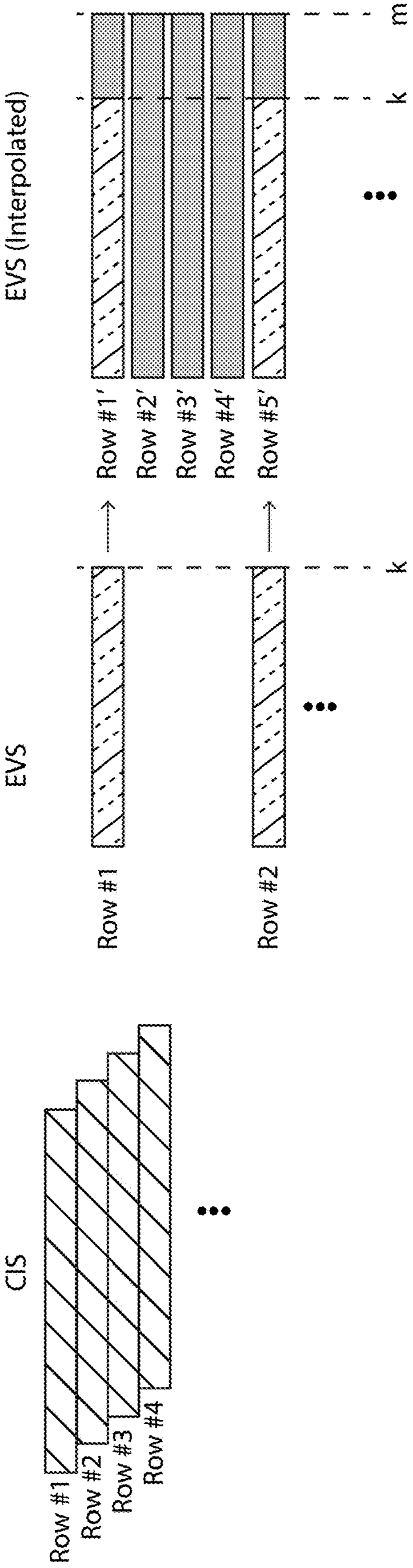
FIG. 8 is partially schematic diagram illustrating yet another method of reducing or eliminating CIS-to-EVS resolution mismatch in accordance with various embodiments of the present technology.

In addition to or in lieu of (1) skipping readout of one or more CIS pixels, one or more CIS pixel rows, and/or one or more CIS pixels and/or (2) vertically and/or horizontally binning CIS data captured using one or more CIS pixels of one or more CIS pixel rows and/or one or more CIS pixel columns, reducing, minimizing, or eliminating CIS-to-EVS resolution mismatch at block 443 of the method 440 of FIG. 4 can include interpolating EVS data. FIG. 8 illustrates one such example in accordance with various embodiments of the present technology.

As shown in FIG. 8, EVS pixels of EVS pixel row #1 correspond to CIS pixels of CIS pixel row #1 through CIS pixel row #4. In addition, in this example, each of the CIS pixel rows #1 through #4 include m columns of CIS pixels whereas the EVS pixel row #1 include k columns of EVS pixels, with k less than m (k<m). EVS pixel row #2 is also shown in FIG. 8 and illustrated with k columns of EVS pixels.

EVS data captured using EVS pixels of EVS pixel row #1 and EVS pixel row #2 can be used to interpolate additional EVS data corresponding to additional rows and/or columns of EVS pixel data. More specifically, as shown in FIG. 8, EVS data captured using EVS pixels of EVS pixel row #1 and EVS pixel row #2 can be used to interpolate additional EVS data corresponding to three additional EVS pixel rows (illustrated as EVS pixels rows #2' through #4') between the EVS pixel row #1 (EVS pixel row #1') and the EVS pixel row #2 (EVS pixel row #5'). Thus, after interpolation, EVS data corresponding to EVS pixels rows #1' through #4' can correspond to CIS data corresponding to CIS pixel rows #1 through #4, respectively. In other words, EVS data captured using EVS pixels of EVS pixel row #1 and EVS pixel row #2 can be used to interpolate additional EVS data corresponding to additional EVS pixel rows to increase resolution of the EVS data, to match a resolution of CIS data captured by CIS pixels, and/or to reduce a mismatch between resolution of CIS data captured by CIS pixels and resolution of the EVS data captured by the EVS pixels.

Additionally, or alternatively, EVS data captured using EVS pixels of EVS pixel row #1 and/or EVS pixel row #2 can be used to interpolate additional columns of EVS data. More specifically, as shown in FIG. 8, EVS data captured using EVS pixels of EVS pixel row #1 and/or EVS pixel row #2 can be used to interpolate additional EVS data corresponding to additional EVS pixel columns for EVS pixel row #1 and/or for EVS pixel row #2. In particular, EVS data captured using EVS pixels of EVS pixel row #1 and/or EVS pixel row #2 can be used to interpolate additional EVS data corresponding to additional EVS pixel columns to increase the number of columns of EVS data of EVS pixel row #1 and/or EVS pixel row #2 from k to m. Thus, after interpolation, EVS data corresponding to EVS pixels row #1' and/or EVS pixel row #5' can correspond to m columns, which matches the number of columns of CIS pixels in each of CIS pixel rows #1 through #4. Similarly, EVS data captured using EVS pixels of EVS pixel row #1 and/or EVS pixel row #2 can be used to interpolate additional EVS data corresponding to additional EVS pixel columns for additional EVS pixels rows #2' through #4'. In other words, EVS data captured using EVS pixels of EVS pixel row #1 and/or EVS pixel row #2 can be used to interpolate additional EVS data corresponding to additional EVS pixel columns to increase resolution of the EVS data, to match a resolution of CIS data captured by CIS pixels, and/or to reduce a mismatch between resolution of CIS data captured by CIS pixels and resolution of the EVS data captured by the EVS pixels.

Although the blocks 441-443 of the method 440 are described and illustrated in a particular order, the method 440 of FIG. 4 is not so limited. In other embodiments, all or a subset of one or more of the blocks 441-443 of the method 440 can be performed in a different order. In these and other embodiments, all or a subset of any of the blocks 441-443 can be performed before, during, and/or after all or a subset of any of the other blocks 441-443. Furthermore, a person skilled in the art will readily appreciate that the method 440 can be altered and still remain within these and other embodiments of the present technology. For example, all or a subset of one or more of the blocks 441-443 can be omitted and/or repeated in some embodiments. As a specific example, EVS pixels and CIS pixels can be reset at block 441 at different times from one another and/or such that they are not aligned with one another (e.g., at the time of data capture and/or at the time of readout).

C. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method of operating an imaging system including a hybrid image sensor, the method comprising:

adjusting a first resolution associated with CMOS image sensor (CIS) pixel data captured using a plurality of CIS pixels of the hybrid image sensor, wherein adjusting the first resolution includes adjusting the first resolution to reduce a mismatch between the first resolution and a second resolution associated with event vision sensor (EVS) pixel data captured using one or more EVS pixels of the hybrid image sensor, and wherein the one or more EVS pixels correspond to the plurality of CIS pixels.

2. The method of claim 1, wherein:

the plurality of CIS pixels are arranged in a plurality of CIS pixel rows;

the method comprises adjusting the first resolution; and adjusting the first resolution includes skipping readout of CIS pixel data corresponding to at least one CIS pixel row of the plurality of CIS pixel rows such that the first resolution is reduced.

3. The method of claim 1, wherein:

the plurality of CIS pixels are arranged in a plurality of CIS pixel columns;

the method comprises adjusting the first resolution; and adjusting the first resolution includes skipping readout of CIS pixel data corresponding to at least one CIS pixel column of the plurality of CIS pixel columns such that the first resolution is reduced.

4. The method of claim 1, wherein:

the plurality of CIS pixels are arranged in a plurality of CIS pixel rows and a plurality of CIS pixel columns;

the one or more EVS pixels include EVS pixels operated as monochrome EVS pixels;

the method comprises adjusting the first resolution; and adjusting the first resolution includes reading out CIS pixel data corresponding to multiple color channels while skipping readout of CIS pixel data corresponding to at least one CIS pixel row of the plurality of CIS pixel rows and/or at least one CIS pixel column of the plurality of CIS pixel columns such that the first resolution is reduced.

5. The method of claim 1, wherein:

the one or more EVS pixels include EVS pixels corresponding to a specific color;

the method comprises adjusting the first resolution; and adjusting the first resolution includes reading out CIS pixel data corresponding to a color channel matching the specific color while skipping readout of CIS pixel data corresponding to a color channel that does not match the specific color.

6. The method of claim 1, wherein:

the plurality of CIS pixels are arranged in a plurality of CIS pixel rows;

the method comprises adjusting the first resolution; and adjusting the first resolution includes binning CIS pixel data captured by CIS pixels positioned in different CIS pixel rows of the plurality of CIS pixel rows from one another.

7. The method of claim 6, wherein:

the one or more EVS pixels include EVS pixels corresponding to a specific color; and binning the CIS pixel data captured by the CIS pixels positioned in the different CIS pixel rows includes binning CIS pixel data corresponding to a color channel that matches the specific color.

8. The method of claim 1, wherein:

the plurality of CIS pixels are arranged in a plurality of CIS pixel columns;

the method comprises adjusting the first resolution; and adjusting the first resolution includes binning CIS pixel data captured by CIS pixels positioned in different CIS pixel columns of the plurality of CIS pixel columns from one another.

9. The method of claim 1, wherein:

the plurality of CIS pixels are arranged in a plurality of CIS pixel rows and a plurality of CIS pixel columns; and adjusting the first resolution includes skipping readout of CIS pixel data corresponding to at least one CIS pixel row of the plurality of CIS pixel rows and skipping readout of CIS pixel data corresponding to at least one CIS pixel column of the plurality of CIS pixel columns such that the first resolution is reduced.

10. The method of claim 1, wherein:

the plurality of CIS pixels are arranged in a plurality of CIS pixel rows and a plurality of CIS pixel columns; and adjusting the first resolution includes binning CIS pixel data captured by CIS pixels positioned in different CIS pixel rows of the plurality of CIS pixel rows and binning CIS pixel data captured by CIS pixels positioned in different CIS pixel columns of the plurality of CIS pixel columns.

11. An imaging system, comprising:

a hybrid image sensor including— an event driven sensing array including one or more event vision sensor (EVS) pixels arranged in one or more EVS pixel rows, wherein each EVS pixel of the one or more EVS pixels is configured to capture EVS data corresponding to contrast information of light incident on that EVS pixel, and wherein EVS data captured using the one or more EVS pixels of the event driven sensing array has an EVS resolution, and a pixel array including a plurality of CMOS image sensor (CIS) pixels arranged in one or more CIS pixel rows, wherein each CIS pixel of the plurality of CIS pixels is configured to capture CIS data corresponding to intensity of light incident on the CIS pixel, and wherein CIS data captured using the plurality of CIS pixels of the pixel array has a CIS resolution; and control circuitry configured to adjust the CIS resolution of the CIS data such that a mismatch between the CIS resolution and the EVS resolution is reduced.

12. The imaging system of claim 11, wherein:

the control circuitry is configured to adjust the CIS resolution of the CIS data; and to adjust the CIS resolution, the control circuitry is configured to skip reading out CIS data captured using CIS pixels of at least one CIS pixel row of the one or more CIS pixel rows.

13. The imaging system of claim 11, wherein:

the plurality of CIS pixels are further arranged in one or more CIS pixel columns;

the control circuitry is configured to adjust the CIS resolution of the CIS data; and to adjust the CIS resolution, the control circuitry is configured to skip reading out CIS data captured using CIS pixels of at least one CIS pixel column of the one or more CIS pixel columns.

14. The imaging system of claim 11, wherein:

an EVS pixel of the one or more EVS pixels is operated as a monochrome EVS pixel;

the plurality of CIS pixels are further arranged in one or more CIS pixel columns;

the control circuitry is configured to adjust the CIS resolution of the CIS data; and to adjust the CIS resolution, the control circuitry is configured to read out CIS data captured using CIS pixels corresponding to multiple colors while skipping readout of CIS data captured using CIS pixels corresponding to at least one CIS pixel row of the one or more CIS pixel rows and/or at least one CIS pixel column of the one or more CIS pixel columns.

15. The imaging system of claim 11, wherein:

an EVS pixel of the one or more EVS pixels corresponds to a specific color;

the control circuitry is configured to adjust the CIS resolution of the CIS data; and to adjust the CIS resolution, the control circuitry is configured to read out CIS data captured using CIS pixels corresponding to the specific color while skipping readout of CIS data captured using CIS pixels corresponding to another color different from the specific color such that a color channel of the CIS data read out matches a color channel of the EVS pixel.

16. The imaging system of claim 11, wherein:

control circuitry is configured to adjust the CIS resolution of the CIS data; and to adjust the CIS resolution, the control circuitry is configured to bin CIS data captured by CIS pixels belonging to two or more CIS pixel rows of the one or more CIS pixel rows.

17. The imaging system of claim 16, wherein:

an EVS pixel of the one or more EVS pixels corresponds to a specific color; and the CIS pixels belonging to the two or more CIS pixel rows each correspond to the specific color.

18. The imaging system of claim 11, wherein:

the plurality of CIS pixels are further arranged in one or more CIS pixel columns;

the control circuitry is configured to adjust the CIS resolution of the CIS data; and to adjust the CIS resolution, the control circuitry is configured to bin CIS data captured by CIS pixels belonging to two or more CIS pixel columns of the one or more CIS pixel columns.

19. The imaging system of claim 11, wherein:

the plurality of CIS pixels are further arranged in one or more CIS pixel columns; and to adjust the CIS resolution, the control circuitry is configured to skip reading out CIS data captured using CIS pixels of at least one CIS pixel row of the one or more CIS pixel rows and skip reading out CIS data captured using CIS pixels of at least one CIS pixel column of the one or more CIS pixel columns.

20. The imaging system of claim 11, wherein:

the plurality of CIS pixels are further arranged in one or more CIS pixel columns; and to adjust the CIS resolution, the control circuitry is configured to bin CIS data captured by CIS pixels belonging to two or more CIS pixel rows of the one or more CIS pixel rows and bin CIS data captured by CIS pixels belonging to two or more CIS pixel columns of the one or more CIS pixel columns.

* * * * *